(12) United States Patent
Moxon

(10) Patent No.: US 10,358,229 B2
(45) Date of Patent: Jul. 23, 2019

(54) AIRCRAFT

(71) Applicant: ROLLS-ROYCE plc, London (GB)

(72) Inventor: Matthew Moxon, Derby (GB)

(73) Assignee: ROLLS-ROYCE plc, London (GB)

( * ) Notice: Subject to any disclaimer, the term of this patent is extended or adjusted under 35 U.S.C. 154(b) by 217 days.

(21) Appl. No.: 15/135,040

(22) Filed: Apr. 21, 2016

(65) Prior Publication Data

US 2016/0332741 A1 Nov. 17, 2016

(30) Foreign Application Priority Data

May 13, 2015 (GB) .................................... 1508138.3

(51) Int. Cl.
*B64D 33/02* (2006.01)
*B64C 15/00* (2006.01)
(Continued)

(52) U.S. Cl.
CPC ................ *B64D 33/02* (2013.01); *B64C 3/50* (2013.01); *B64C 11/001* (2013.01); *B64C 15/00* (2013.01); *B64C 21/00* (2013.01); *B64D 27/02* (2013.01); *B64D 27/10* (2013.01); *B64D 27/24* (2013.01); *B64D 29/04* (2013.01); *B64D 33/04* (2013.01); *B64D 2027/026* (2013.01);
(Continued)

(58) Field of Classification Search
CPC ........ B64D 33/02; B64D 29/04; B64D 27/24; B64D 27/10; B64D 33/04; B64D 27/02; B64D 2033/0226; B64D 2027/026; B64C 3/50; B64C 11/001; B64C 15/00; B64C 21/00; Y02T 50/44; Y02T 50/166
See application file for complete search history.

(56) References Cited

U.S. PATENT DOCUMENTS 3,117,748 A * 1/1964 Gerlaugh ............ B64C 29/0016
244/15
3,614,028 A * 10/1971 Kleckner .................. B64C 9/20
244/15
(Continued)

FOREIGN PATENT DOCUMENTS

EP 1655474 A2 5/2006
EP 2543862 A2 1/2013
(Continued)

OTHER PUBLICATIONS

Sep. 6, 2016 Search Report issued in European Patent Application No. 16166183.
(Continued)

*Primary Examiner* — Valentina Xavier
(74) *Attorney, Agent, or Firm* — Oliff PLC

(57) ABSTRACT

An aircraft including trailing edge flaps, a wing mounted propulsor positioned such that the flaps are located in a slipstream of the first propulsor in use when deployed. The aircraft further including a thrust vectorable propulsor configured to selectively vary the exhaust efflux vector of the propulsor in at least one plane. The thrust vectorable propulsor includes a ducted fan configurable between a first mode, in which the fan provides net forward thrust to the aircraft, and a second mode in which the fan provides net drag to the aircraft. The fan is positioned to ingest a boundary layer airflow in use when operating in the first mode.

15 Claims, 2 Drawing Sheets

(51) Int. Cl.
  *B64C 21/00* (2006.01)
  *B64D 27/02* (2006.01)
  *B64C 3/50* (2006.01)
  *B64C 11/00* (2006.01)
  *B64D 27/10* (2006.01)
  *B64D 27/24* (2006.01)
  *B64D 29/04* (2006.01)
  *B64D 33/04* (2006.01)

(52) U.S. Cl.
  CPC ..... *B64D 2033/0226* (2013.01); *Y02T 50/166* (2013.01); *Y02T 50/44* (2013.01)

(56) References Cited

U.S. PATENT DOCUMENTS

| | | | |
|---|---|---|---|
| 3,658,279 | A | 4/1972 | Robertson |
| 3,829,044 | A * | 8/1974 | Leslie ................ B64C 29/0041 244/13 |
| 2006/0097107 | A1 | 5/2006 | Parks et al. |
| 2008/0121756 | A1 * | 5/2008 | McComb ................ B64C 15/02 244/60 |
| 2014/0367510 | A1 | 12/2014 | Viala et al. |
| 2015/0226156 | A1 | 8/2015 | Tillman et al. |
| 2016/0083075 | A1 * | 3/2016 | Moxon ................... B64C 3/385 244/13 |
| 2017/0107914 | A1 * | 4/2017 | Lu ............................ F02C 9/54 |

FOREIGN PATENT DOCUMENTS

| | | |
|---|---|---|
| EP | 2 581 308 A2 | 4/2013 |
| EP | 2597038 A2 | 5/2013 |
| EP | 2730501 A2 | 5/2014 |
| GB | 545587 A | 6/1942 |
| GB | 978574 A | 12/1964 |
| GB | 2023075 A | 12/1979 |
| GB | 2037895 A | 7/1980 |

OTHER PUBLICATIONS

Nov. 11, 2015 Search Report issued in British Patent Application No. GB1508138.3.

* cited by examiner

AIRCRAFT

The present disclosure concerns an aircraft.

Conventional aircraft comprise a tubular fuselage having wings extending therefrom for providing lift. Engines in the form of, for example, turbofans and turboprops are mounted on the aircraft for providing forward thrust. A conventional location for mounting aircraft engines is on the wing.

There is a continuing need for more efficient aircraft designs, in terms of structural efficiency (i.e. minimising the overall weight of the aircraft structure), aerodynamic efficiency (i.e. minimising the aerodynamic drag incurred during flight) and fuel efficiency (i.e. minimising the fuel required to perform a particular aircraft mission).

One solution for increasing aircraft efficiency is to provide an aircraft having propulsors such as ducted fans or propellers located forward of the wing, with a flap being located in the slipstream of the propulsor. Such an arrangement is known as a "deflected slipstream" aircraft, "externally blown flaps" or "powered lift". Examples include the Breguet 941 and the Boeing C-17 Globemaster III. Such an arrangement provides additional lift where the engines are run at relatively high power, and the flaps are deployed. Consequently, the takeoff/landing speed or field length can be reduced. Alternatively, for a given takeoff/landing speed or field length, the wings can be decreased in area, leading to a reduction in at least skin friction drag, and possibly also lift induced drag if the aspect ratio is increased, and so reduced operating costs.

However, since a significant proportion of lift in the takeoff and landing configuration is provided by the blown flaps, reduced lift is available where the engines are run at lower power. Consequently, it may be difficult to slow down sufficiently for landing due to the high thrust provided by the propulsors when the flaps are blown. Alternatively, high approach speeds would be required where the flaps are not blown, in order to provide sufficient lift to keep the aircraft airborne. One solution is to provide high drag devices (known as airbrakes) for deployment during landing. However, such devices may interfere with the propeller slipstream where they are installed on the wing. Airbrakes installed on the fuselage may have insufficient area to be effective, and may interfere with airflow to the tail. Furthermore, such devices are not utilised for the remainder of the flight, and so represent deadweight for the majority of operation.

A further disadvantage of such systems, is that the centre of lift may change (generally, it will move rearwardly) when the flaps are deployed, producing a significant nose-down pitching moment. This must be counteracted by the pitch control surfaces, and this requirement may necessitate larger pitch control surfaces than would otherwise be necessary, contributing to increased drag.

Alternatively, it is known to increase propulsive efficiency of an aircraft by providing propulsors (such as ducted fans or propellers) which ingest boundary layer air. Boundary layer air extends from a wetted surface to a thickness normally defined as the distance from the wetted surface at which the viscous flow velocity is 99% of the freestream velocity (the surface velocity of an inviscid flow). Consequently, boundary layer air moves more slowly than the freestream flow. As such, the propulsors will accelerate the airflow to a greater extent for the same exhaust velocity, thereby increasing propulsive efficiency.

Aircraft have been proposed which take advantage of these effects by placing one or more propulsors at an aft end of the aircraft. A first example includes the Sax40 proposed by the Silent Aircraft Initiative and described in Airframe Design for "Silent Aircraft", J Hileman, Z Spakovszky, M Drela and M Sargeant, AIAA-2007-0453, 45th AIAA Aerospace Sciences Meeting and Exhibit, Reno, Nev. A second example includes the NASA D8, described in External Aerodynamics Simulations for the MIT D8 "Double-Bubble" Aircraft Design, S Pandya, Seventh International Conference on Computational Fluid Dynamics (ICCFD7), Big Island, Hi., Jul. 9-13, 2012. A further known aircraft is described in EP2581308.

It is an object of the present invention to alleviate the problems of the prior art at least to some extent.

According to a first aspect of the present disclosure there is provided an aircraft comprising:

a thrust vectorable propulsor configured to selectively vary the exhaust efflux vector of the thrust vectorable propulsor in at least one plane and configurable between a first mode, in which the thrust vector propulsor provides net forward thrust to the aircraft, and a second mode in which the thrust vector propulsor provides net drag to the aircraft, the thrust vector propulsor being positioned to ingest a boundary layer airflow in use when operating in the first mode.

Advantageously, the thrust vectorable propulsor can be used to provide additional drag when operating in the second mode, thereby enabling the first propulsor to be run at high power, to thereby provide a high velocity slipstream to the high lift device, and so provide high lift on landing, while also enabling operation at low speed, or enabling high descent rates. Meanwhile, the propulsor can be utilised to provide forward thrust when operated in the first mode, and ingests boundary layer air, thereby increasing propulsive efficiency, and contributing to increased aircraft performance and reduced fuel burn in other stages of flight. Consequently, the system does not represent "deadweight" in any stage of flight. The propulsor is also vectorable, thereby allowing the tail volume to be reduced, since the yaw imbalance in the event of the loss of an engine can be countered by the vectorable propulsor.

The aircraft may comprise a deployable high lift device such as one or more flaps located at a trailing edge of the wing, and/or one or more slats located at a leading edge of the wing.

The aircraft may comprise a further propulsor. The further propulsor may be located such that the high lift device is located in a slipstream of the further propulsor in use when deployed. The further propulsor may comprise an electrically or mechanically driven propeller or ducted fan. The further propulsor may be located having an intake located ahead of a leading edge of the wing.

The aircraft may comprise an internal combustion engine such as a gas turbine engine, which may be arranged to provide power to the first and second propulsors. Alternatively or in addition, the aircraft may comprise an electrical power source such as a battery or a hydrogen fuel cell arranged to provide power to the first and second propulsors.

The aircraft may comprise a plurality of further propulsors. A plurality of further propulsors may be powered by each internal combustion engine.

The aircraft may comprise an internal combustion engine driven electrical generator, the electrical generator being electrically coupled to one or more further and/or thrust vectorable propulsor driving electrical motors to thereby power the further propulsors. Alternatively or in addition, the aircraft may comprise an internal combustion engine driven gearbox configured to drive at least one of the propulsors.

The thrust vectorable propulsor may comprise one of a ducted fan and a propeller. The thrust vectorable propulsor may comprise an intake positioned at an aft end of a fuselage of the aircraft.

The thrust vectorable propulsor may comprise a variable pitch fan located within a duct. The thrust vectorable propulsor may comprise an inlet guide vane positioned upstream of the fan, and may comprise an outlet guide vane positioned downstream of the fan. One or both of the inlet and outlet guide vanes may be variable pitch.

The thrust vectorable propulsor may comprise a variable area inlet arrangement, and may comprise a variable area outlet arrangement. For example, the duct may comprise a duct wall having a translatable section configured to open an annular gap in the duct wall when in an open position, and close the annular gap when in a closed position. The thrust vectorable propulsor may comprise a translatable plug nozzle configured to increase the outlet area when in a first position and decrease the outlet area when in a second position.

The thrust vectoring propulsor may comprise a thrust vectoring nozzle, which may comprise the translatable plug, which may be rotatable.

The skilled person will appreciate that except where mutually exclusive, a feature described in relation to any one of the above aspects of the invention may be applied mutatis mutandis to any other aspect of the invention.

Embodiments of the invention will now be described by way of example only, with reference to the Figures, in which.

Figure 1:
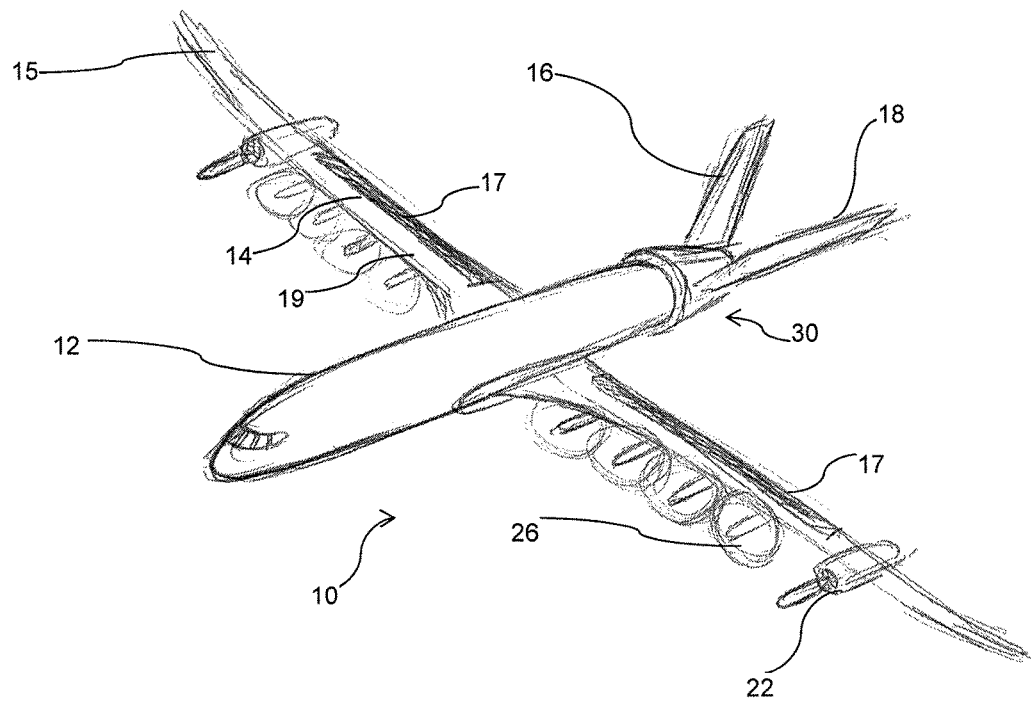
FIG. 1 is a perspective side view of an aircraft in accordance with the present disclosure.

FIG. 1 shows an aircraft 10 in accordance with the present disclosure. The aircraft 10 comprises a fuselage 12, wings 14, empennage and a propulsion arrangement.

The aircraft 10 has a generally tubular fuselage 12, and a high aspect ratio straight wing 14. Each wing comprises winglets 15 provided at the tips of the wings 14. Each wing further optionally comprises deployable high lift devices in the form of trailing edge flaps 17, which can be deployed to increase the lift generated by the wing 14 in flight, at the expense of increased drag, or retracted to minimise drag. Similarly, optional leading edge deployable high lift devices in the form of slats 19 are provided, which again provide increased lift and drag when deployed.

The empennage comprises a "canted tail" or "V-tail" configuration, comprising a pair of stabilising surfaces 16, 18 extending generally upwardly from the fuselage 12, and canted outwardly away from a centre line. Each stabilising surface 16, 18 comprises a control surface 20 which can be deflected to provide one or both of pitch and yaw control. Such devices are known in the art as "ruddervators". Such an arrangement would result in reduced drag due to the decreased wetted area of such an arrangement. In part due to the propulsor arrangement (as explained in further detail below), the yaw required by the vertical rudder in the event of one engine being inoperative is reduced. Consequently, in a conventional cruciform or T-tail, the vertical stabiliser area could be reduced. If this were done by reducing the height of the vertical stabiliser, the rudder may be ineffective as a result of the reduced aspect ratio, or the vertical stabiliser no longer penetrating the boundary layer to the same extent, which would reduce the reduction of tail surface area available. By introducing a butterfly tail, overall area of the empennage can be reduced, while maintaining reasonable sized control surfaces. It will be understood however, that the empennage may be removed entirely, or may comprise a conventional empennage.

The propulsion arrangement comprises a pair of gas turbine engines 22 located on the wings 14. The gas turbine engines 22 are each configured to drive an electrical generator 24 (shown schematically in FIG. 4) in order to produce electrical power. The gas turbine engines 22 produce a relatively small amount of thrust, which is directed through a nozzle (not shown) to provide forward thrust for the aircraft 10. Due to the relatively small amount of thrust generated, the gas turbine engines 22 can be mounted relatively far from the fuselage 12, since relatively little asymmetric yaw will be generated in the event of a single engine failure. Consequently, the relatively high weight of the gas turbine engines 22 and electrical generators provides inertia relief, thereby permitting relatively light wing construction, which may in turn enable relatively high aspect ratio wings to be employed.

The propulsion arrangement further comprises a plurality of further propulsors in the form of propellers 26 mounted to the wing 14, having an inlet and an outlet forward of a leading edge of the wing 14. Consequently, the propellers 26 ingest freestream air, and provide a slipstream downstream, over the wing 14, as well as the leading edge slats 19 and trailing edge flaps 17 when deployed. In this embodiment, a total of eight propellers 26 are provided, four on each wing. In general, it is desirable to provide a plurality of further propulsors for each gas turbine engine, such that the gas turbine engine has a high effective bypass ratio, which results in high propulsive efficiency, while permitting relatively low diameter propellers. The first propulsors 26 are relatively closely spaced, and extend along a significant proportion of the span of the wing 14. Consequently, at least 50% of the span of the wing is located in the slipstream of the first propulsors 26, and so a large increase in lift is provided when thrust is provided by the propellers 26, compared to where the propellers 26 are inoperative.

Figure 2:
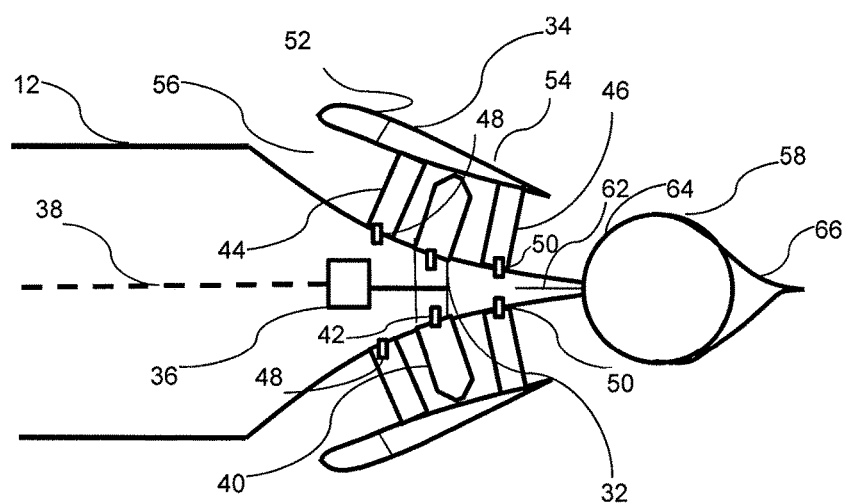
FIG. 2 is a sectional side view through part of the aircraft of FIG. 1 in a first position.
Figure 3:
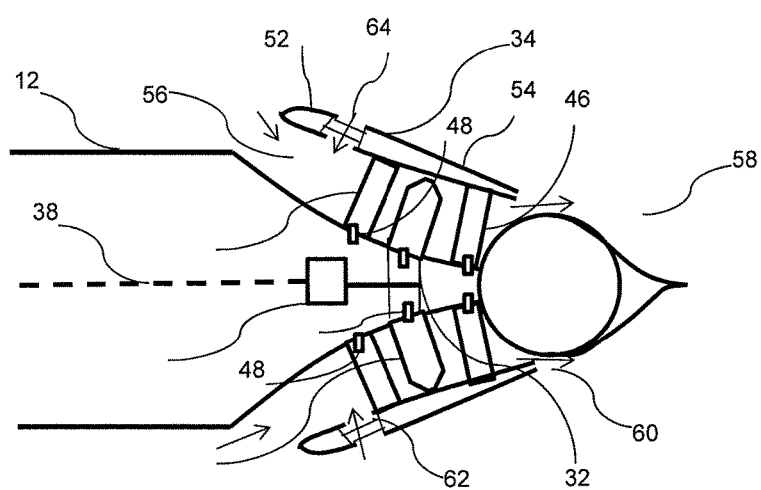
FIG. 3 is a sectional side view through the part shown in FIG. 2 in a second position.

The aircraft 10 further comprises a thrust vector propulsor indicated generally at 30, shown in further detail in FIGS. 2 and 3.

The thrust vector propulsor 30 is located at an aft end of the fuselage 12, and comprises a ducted fan comprising a fan rotor 32 housed within a generally annular nacelle 34. The fan rotor 32 is coupled to a motor 36, which is in turn powered by a gas turbine engine driven generator 24 via an electrical interconnector 38.

The fan rotor 32 comprises a plurality of rotor blades 40. The ducted fan comprises a pitch changing mechanism 42 configured to alter the pitch of the rotor blades 40. The pitch changing mechanism 42 and blades 40 are configured to change pitch in flight between at least a forward pitch angle, which produces forward thrust for operation in a first mode, and a reverse thrust pitch angle, which produces at least net drag (and possibly also reverse thrust) for operation in a second mode. In the second mode, the thrust vectorable propulsor 30 therefore provides net drag to the aircraft 10, which may partly counteract the high thrust provided by the first propulsors 26 where they are operated at high power for providing powered lift. The thrust vectorable propulsor may be coupled to an electric motor. The electric motor provides motive power to drive the propulsor 30 when in the first mode, and provides a load to the propulsor 30 when in the second mode. Where a battery is connected to the electric motor, the propulsor 30 may charge the battery when in the second mode.

The thrust vectorable propulsor 30 further comprises inlet and outlet guide vanes 44, 46. When the propulsor 30 is operated in the first mode, the inlet guide vanes 44 guide inlet air to the fan face at a required angle. Similarly, the outlet guide vanes 46 remove swirl from air exiting the propulsor 30, thereby increasing propulsive efficiency. When operated in the second mode, the roles of the inlet and outlet guide vanes 44, 46 are reversed. In order to facilitate this, the inlet and outlet guide vanes may have variable pitch provided by respective pitch change mechanisms 48, 50.

The thrust vectorable propulsor 30 may operate in a broad range of inlet and outlet flow conditions, at a broad range of speeds and altitudes, as well as with air entering from different directions. Consequently, variable inlet and outlet areas may be required. Consequently, the thrust vectorable propulsor 30 is configurable between first and second inlet and outlet configurations.

FIG. 2 shows the thrust vectorable propulsor 30 in a first inlet condition and a first outlet condition. A forward section 52 of the nacelle 34 abuts a rearward section 54 of the nacelle, such that air may be ingested by the fan when operated in the first mode via only a generally annular primary air inlet 56 defined by the aircraft fuselage 12 and nacelle 34, which extends at least part way around the circumference of the fuselage 12. A plug nozzle 58 is also provided downstream of the fan when operated in the first mode. The plug nozzle 58 and nacelle 34 together define an air outlet 60. Due to the location of the air inlet 56 at a relatively aft end of the fuselage 12, and in view of the relatively narrow gap between the nacelle 34 and the fuselage 12 at the inlet 56, the primary inlet will ingest boundary layer air during cruise conditions when operated in the first inlet condition. The term "boundary layer" will be understood by the skilled person to represent the region of airflow over a surface where the flow velocity is less than 99% of the free stream velocity. The boundary layer thickness δ at a given point on a wetted surface is dependent on an axial distance x from an upstream end (i.e. a leading edge) of the respective component, a freestream velocity U adjacent the wetted surface, and the viscosity v of the fluid in accordance with the following equation:

$$\delta = 0.37 \times \left(\frac{Ux}{v}\right)^{-\frac{1}{5}} \qquad \text{Equation 1}$$

In one example, for an aircraft having a length of 37.5 meters, a cruising speed of 230 meters per second at an altitude of 11,000 meters, and a viscosity of air at this altitude under standard atmospheric conditions being 1.458 $10^{-5}$ N·s/m$^2$, the corresponding boundary layer thickness at the tail of fuselage at cruise is approximately 50 cm.

In some cases, the boundary layer thickness may be increased due to turbulent boundary layer separation, caused for example by high angles of attack of the surface relative to the relative wind. In any case, the boundary layer thickness of the aircraft in cruise can be easily ascertained for a given aircraft design.

Boundary layer air therefore has a relatively low velocity compared to free stream air, as a consequence of the effects of viscosity (i.e. drag created by the fuselage). Consequently, the second propulsors 30 acts to reaccelerate this flow. This is thought to increase the propulsive efficiency of the second propulsor 30, and to reduce the wake produced by the aircraft, and so reduce drag. Consequently, the thrust vectorable propulsor 30 reduces aircraft total fuel burn per mile when operated in the first mode.

FIG. 3 shows the propulsor 30 in a second inlet and outlet condition. The forward section 52 is translated forwardly by actuator 62 to open an annular gap 64 in the nacelle 34 between the forward and rearward nacelle sections 52, 54. In the second inlet condition, and in the first operating mode, air may pass to the fan inlet from both the primary air inlet 56 and the gap 64. Consequently, the overall inlet area is increased. Similarly, the plug nozzle 58 is translated forwardly by actuator 66 to thereby decrease the spacing between the nacelle 34 and plug nozzle 58, and so reduce the exit area of the second propulsor 30.

The plug nozzle 58 is also rotatable in both the horizontal and vertical axis with respect to where the aircraft is level with the ground. The plug nozzle 58 comprises a generally part spherical leading edge surface 64 and a generally conically shaped trailing edge surface 66, such that the overall plug nozzle 58 is tear-drop shaped. Consequently, where the plug nozzle 58 is rotated, air leaving the second propulsor 30 (when operated in the first mode) is redirected in accordance with the position of the nozzle 58. For example, the plug nozzle 58 is rotatable about the vertical axis in order to provide a yawing moment, and about a horizontal axis in order to provide a pitching moment.

Figure 4:
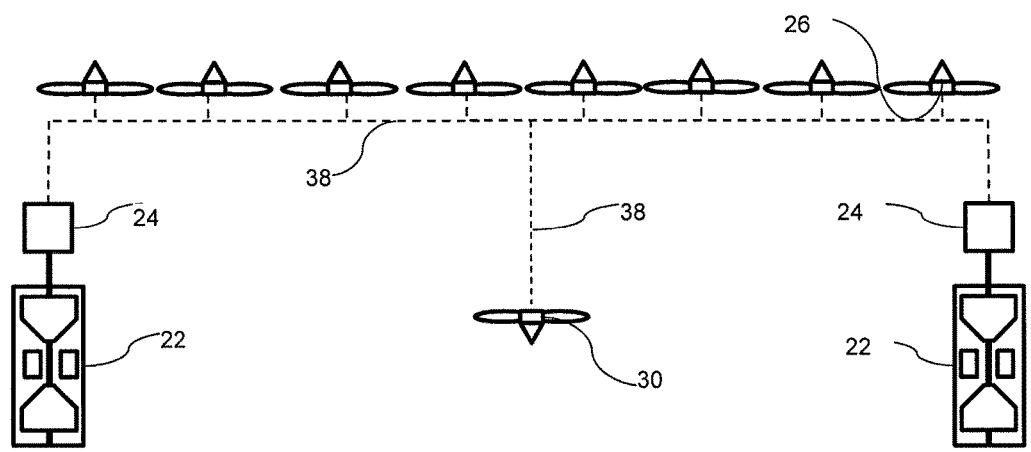
FIG. 4 is a schematic view of the electrical and mechanical connections of part of the aircraft of FIG. 1.

FIG. 4 illustrates the electrical network which provides electrical power from the engine driven generator 24. The system comprises a pair of gas turbine engines 22, each driving a separate generator 24. Each generator 24 is electrically coupled to an electrical interconnector 38, which is in turn electrically coupled to respective motors coupled to the first and second propulsors 26, 30. The electrical interconnector 38 comprises a conventional conductor such as copper or aluminium, and similarly, the generators 24 comprise conventional AC electrical generators. However, the generators and electrical interconnector could alternatively comprise superconducting generators and conductors.

The aircraft may be operated as follows. During takeoff, the flaps 17 and slats 19 are deployed, and the further propulsors 26 are operated at full power to provide maximum forward thrust. The thrust vectorable propulsor 30 is also operated at full power in the first mode in order to provide maximum forward thrust. The aircraft 10 accelerates down the runway, and a pitch-up manoeuvre is performed once the aircraft 10 has reached a sufficient airspeed using the ruddervators 16, 18. The plug nozzle 58 may be rotated about the horizontal axis so as to deflect air upwardly to assist the ruddervators in producing an upward pitching moment. The forward section 52 of the nacelle is translated to a position such that the inlet area matches the mass flow rate capacity of the fan 32. For example, the forward section 52 may be translated forwardly to increase the inlet area at the beginning of the takeoff role, and progressively closed as speed increases. The plug nozzle 58 is translated so as to ensure that the fan operating point is maintained to avoid stalling, as would be understood by the skilled person. Similarly, the inlet and outlet guide vanes 44, 46 are adjusted to maintain fan operating margin in accordance with inlet and outlet conditions.

Once in the air and at sufficient speed, the flaps 17 and slats 19 are retracted. The propulsors 26, 30 continue to operate to provide thrust, to enable the aircraft 10 to climb. As the flaps 17 are retracted, an upward pitching moment may be produced, as the downward pitching previously caused by the flaps 17 is no longer provided. Consequently, the plug nozzle 58 may be rotated back to a rearward position, such that air from the thrust vectorable propulsor 30 is directed substantially rearwardly. During flight, the plug nozzle 58 orientation may be adjusted in both the horizontal and vertical axes to provide pitch and yaw moments respectively. Alternatively or in addition, the plug nozzle 58 may be oriented to match the exhaust streamlines to the external streamlines, thereby limiting base drag.

Toward the end of the flight, as the aircraft 10 approaches the runway, the flaps 17, 19 are dropped again to increase drag and lift for slow flight. In order to provide sufficient airflow at low speeds for the flaps and slats 17, 19 to operate satisfactorily, the further propulsors 26 continue to operate to produce relatively high levels of thrust. In such circumstances, is it necessary to increase the airframe drag considerably. Consequently, the thrust vectorable propulsor 30 propeller blade 32 pitch is reversed, such that the thrust vectorable propulsor 30 provides reverse thrust. As a consequence, the aircraft 10 is slowed, enabling steep descents without accelerating to excessive speeds. The inlet and outlet guide vanes 46, 46 may adjust in order to maintain required flow conditions.

In the event of the failure of one of the gas turbine engines 22, power can be directed to the propulsors 26, 30 from the remaining gas turbine engine 22. Consequently, very little yaw moment will be produced in view of the relatively small direct contribution to thrust made by the gas turbine engines 22. However, in the event of loss of a wing mounted propulsor 26, a yaw moment toward the inoperative engine will be produced in view of the continued thrust produced by the remaining engines. This will be particularly pronounced where the inoperative propulsor 26 is located near to the wing tip, i.e. far from the aircraft centre of mass. Where a wing mounted propulsor 26 is lost during takeoff or landing, this yaw moment will be further increased and accompanied by pitching and rolling moments and a significant loss of lift in view of the local loss of airflow over the deployed flap in the inoperative propulsor 26 slipstream. Consequently, remedial action must be taken to overcome these moments and changing forces. The second propulsor 30 can be assist, by pivoting the outlet nozzle 58 to provide the desired vectored thrust to provide yaw and pitching moments. Consequently, the size of the pitch and yaw control surfaces could be reduced in view of the decreased reliance on these surface in the event of one propulsor being inoperative. Alternatively, the $V_{mca}$ (i.e. the certified minimum flight speed at which the aircraft is controllable with one engine inoperative) could be reduced in view of the reduced impact of a propulsor becoming inoperative. This could result in increased operational flexibility, and possibly reduced takeoff and landing distances in view of the lower approach and takeoff speeds that a lower $V_{mca}$ would allow.

Since the thrust vectorable propulsor 30 is safety critical, it may be desirable to provide a health monitoring system to determine whether the second propulsor is in adequate condition to ensure aircraft flight safety. For example, electric motor performance may be monitored by measuring characteristics of the motor such as temperature, electrical resistance etc, and providing a signal where a failure is imminent. Alternatively or in addition, further components of the second propulsor (such as the fan 32, inlet and outlet guide vane 46, 48, and nozzle 58) could be monitored, and a signal provided where a failure is imminent. In one example, the health monitoring system comprises a sensor for measuring fan power requirement compared to the fan rotational speed, a further sensor for sensing vibration, sensors for monitoring the position of the variable geometry intake and nozzle. If any of these sensors detect an out of bounds condition, a signal may be sent to the flight management system indicated that the second propulsor is inoperable. In particular, variable inlet and outlet settings affect fan operating point, and asymmetry will produce out-of-balance loads on the fan which will cause vibrations. Where the health monitoring system detect that an out-of-balance condition exists, the thrust vectoring system may be utilised to correct fan out-of-balance conditions by introducing asymmetric flow conditions counteracting fan or motor damage. This might produce an undesired thrust vectoring effect. However, such an effect might be counteracted either by additional use of variable geometry, or by using the rest of the aircraft control system to counteract the out-of-trim condition.

In the event that the thrust vectorable propulsor may not be available, limitations may be placed on the aircraft flight envelope. For example, a high landing speed may be imposed where vectoring and/or second mode operation of the second propulsor may not be functional. In such circumstances, the first propulsors would be operated at or near idle on landing, such that the flaps are not blown to the same extent as where the first propulsors are operated at high power. However, since the first propulsors are not operated at high power, reverse thrust (or increased drag) from the second propulsors is not required. Such operation may however require a divert to a landing site having a longer runway.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

For example, the thrust vectorable propulsor could comprise an open rotor propeller. Forward and rearward thrust could be provided by reversing the direction of the propeller, instead or in addition to changing the pitch of the blades. In a further alternative, the second propulsor could comprise a bleed from a gas turbine engine. In a still further alternative, rearward thrust could be provided using a translating nacelle, blocker doors and cascade vanes, in an arrangement similar to that provide on the Rolls-Royce Trent 700 for example. In a yet further alternative, rearward thrust could be provided by rotating the exhaust nozzle beyond 90°, such that thrust is redirected forwardly.

Different variable area and vectoring inlet and outlet nozzles could be provided. For example, the outlet nozzle could comprise a plurality of movable, overlapping petals. Alternatively, the vectoring/variable area outlet nozzle could be omitted, particularly where inlet and outlet variable guide vanes are provided.

Different numbers of propulsors could be provided. For example, two or more thrust vectorable propulsors could be provided to provide redundancy. The propulsors could be located in different positions. For example, the further propulsors could be located further inboard or outboard on the wing, and the thrust vectorable propulsor could be located elsewhere on the aircraft.

The second operating mode of the thrust vectorable propulsor may comprise operating the propeller in a drag creating mode, rather than a reverse thrust mode. For example, the motor 36 could be switched to a generating mode, and the fan 32 could then "windmill" in the aircraft airstream to generate electrical power, which could be transmitted to the first propulsors 26 via electrical bus 38. Such an arrangement may provide a simpler arrangement, in which a reverse pitch/reverse thrust fan is not required.

The invention claimed is:

1. An aircraft comprising:
a thrust vectorable propulsor provided at a tail of the aircraft and configured to selectively vary the exhaust efflux vector of the propulsor in at least one plane and configurable between a first mode, in which the thrust vectorable propulsor provides net forward thrust to the aircraft, and a second mode in which the thrust vectorable propulsor provides net drag to the aircraft, the thrust vectorable propulsor being positioned to ingest a boundary layer airflow of a fuselage of the aircraft in use when operating in the first mode;
a deployable high lift device comprising at least one of one or more flaps located at a trailing edge of a wing of the aircraft, and one or more slats located at a leading edge of the wing, the deployable high lift device being deployable to increase the lift generated by the wing in flight;
a plurality of further propulsors located on the wing, which are not a thrust vectorable propulsors, located such that the high lift device is located in a slipstream of the plurality of further propulsors in use when deployed; and
an internal combustion engine for providing power to the plurality of propulsors, the internal combustion engine being positioned on the wing outboard of the plurality of further propulsors relative to the fuselage.

2. An aircraft according to claim 1, wherein the deployable high lift device comprises at least one flap located at the trailing edge of the wing, and at least one slat located at the leading edge of the wing and corresponding to the flap, the at least one flap and the at least one slat being located in the slipstream of the plurality of further propulsors in use when deployed.

3. An aircraft according to claim 1, wherein at least one of the thrust vectorable propulsor and the plurality of further propulsors comprises an electrically or mechanically driven propeller or ducted fan.

4. An aircraft according to claim 1, wherein the plurality of further propulsors each comprise an intake located ahead of a leading edge of the wing.

5. An aircraft according to claim 1, wherein the aircraft comprises at least one of an internal combustion engine arranged to provide power to at least the thrust vectorable propulsor, and an electrical power source arranged to provide power to at least the thrust vectorable propulsor.

6. An aircraft according to claim 5, wherein the aircraft comprises at least one of an internal combustion engine driven electrical generator, the electrical generator being electrically coupled to one or more propulsor driving electrical motors to thereby power one or more of the plurality of further propulsors, and an internal combustion engine driven gearbox configured to drive at least one of the plurality of further propulsors.

7. An aircraft according to claim 1, wherein the thrust vectorable propulsor comprises an intake positioned at an aft end of the fuselage.

8. An aircraft according to claim 1, wherein the thrust vectorable propulsor comprises a variable pitch fan located within a duct.

9. An aircraft according to claim 8, wherein the thrust vectorable propulsor comprises at least one of an inlet guide vane positioned upstream of the fan, and an outlet guide vane positioned downstream of the fan.

10. An aircraft according to claim 9, wherein one or both of the inlet and outlet guide vanes are variable pitch.

11. An aircraft according to claim 3, wherein the thrust vectorable propulsor comprises at least one of a variable area inlet arrangement, and a variable area outlet arrangement.

12. An aircraft according to claim 11, wherein the thrust vectorable propulsor comprises a duct wall having a translatable section configured to open an annular gap in the duct wall when in an open position, and close the annular gap when in a closed position.

13. An aircraft according to claim 11, wherein the thrust vectorable propulsor comprises a translatable plug nozzle configured to increase the outlet area when in a first position and decrease the outlet area when in a second position.

14. An aircraft comprising:
a thrust vectorable propulsor configured to selectively vary the exhaust efflux vector of the propulsor in at least one plane and configurable between a first mode, in which the thrust vectorable propulsor provides net forward thrust to the aircraft, and a second mode in which the thrust vectorable propulsor provides net drag to the aircraft, the thrust vectorable propulsor being positioned to ingest a boundary layer airflow in use when operating in the first mode;
a motor for driving the thrust vectorable propulsor;
an electric power source arranged to provide power to the motor; and
of an internal combustion engine arranged to provide power to the electrical power source, the internal combustion engine being positioned on a wing outboard of a plurality of further propulsors relative to the fuselage.

15. An aircraft comprising:
a thrust vectorable propulsor provided at a tail of the aircraft and configured to selectively vary the exhaust efflux vector of the propulsor in at least one plane and configurable between a first mode, in which the thrust vectorable propulsor provides net forward thrust to the aircraft, and a second mode in which the thrust vectorable propulsor provides net drag to the aircraft, the thrust vectorable propulsor being positioned to ingest a boundary layer airflow of a fuselage of the aircraft in use when operating in the first mode;
a deployable high lift device comprising one or more slats located at a leading edge of the wing, the one or more slats being deployable to increase the lift generated by the wing in flight; and
a plurality of further propulsors located such that the one or more slats is located in a slipstream of the plurality of further propulsors in use when deployed; and
an internal combustion engine for providing power to the plurality of propulsors, the internal combustion engine being positioned on the wing outboard of the plurality of further propulsors relative to the fuselage.

* * * * *